United States Patent
Jentsch et al.

(10) Patent No.: US 7,225,433 B2
(45) Date of Patent: May 29, 2007

(54) DYNAMIC BREAKPOINTS FOR COMPUTER SOFTWARE

(75) Inventors: Frank Jentsch, Mühlhausen (DE); Ralph Wagenführer, Frankenthal (DE)

(73) Assignee: SAP Aktiengesellschaft, Walldorf (DE)

( * ) Notice: Subject to any disclaimer, the term of this patent is extended or adjusted under 35 U.S.C. 154(b) by 606 days.

(21) Appl. No.: 10/612,011

(22) Filed: Jul. 3, 2003

(65) Prior Publication Data

US 2004/0059961 A1  Mar. 25, 2004

(30) Foreign Application Priority Data

Jul. 4, 2002 (EP) .................................. 02014790

(51) Int. Cl.
*G06F 9/44* (2006.01)
*G06F 15/00* (2006.01)
*G06F 11/00* (2006.01)

(52) U.S. Cl. .............. 717/129; 717/125; 717/130; 717/131; 712/226; 712/227; 714/35

(58) Field of Classification Search ............ None
See application file for complete search history.

(56) References Cited

U.S. PATENT DOCUMENTS

| | | | | |
|---|---|---|---|---|
| 5,664,159 A | * | 9/1997 | Richter et al. ............... 703/23 |
| 6,071,317 A | * | 6/2000 | Nagel ........................ 717/128 |
| 6,077,312 A | * | 6/2000 | Bates et al. ................ 717/129 |
| 6,735,636 B1 | * | 5/2004 | Mokryn et al. ............... 710/5 |
| 6,760,907 B2 | * | 7/2004 | Shaylor ..................... 717/158 |
| 6,769,117 B2 | * | 7/2004 | Moore ....................... 717/130 |
| 6,928,639 B2 | * | 8/2005 | Juan et al. .................. 717/127 |
| 7,000,225 B2 | * | 2/2006 | Sangavarapu et al. ...... 717/129 |
| 2003/0145251 A1 | * | 7/2003 | Cantrill ...................... 714/35 |

OTHER PUBLICATIONS

Jonathan B. Rosenberg, How Debuggers Work, Sep. 1996, Wiley Computer Publishing, Chapters 2, 5 and 6.*
U.S. Appl. No. 10/611,860, filed Jul. 3, 2003, entitled "Methods And Systems For Debugging A Computer Program Code.".

* cited by examiner

*Primary Examiner*—Antony Nguyen-Ba
(74) *Attorney, Agent, or Firm*—Finnegan Henderson Farabow Garrett & Dunner LLP

(57) ABSTRACT

Methods and systems are disclosed for debugging a computer program code by using a debugging software. Software means may be provided for causing the debugging software to stop at a breakpoint set in the computer program code. In one embodiment, a method is provided that comprises making the debugging software stop at a breakpoint based on one or more predefinable conditions.

27 Claims, 2 Drawing Sheets

DYNAMIC BREAKPOINTS FOR COMPUTER SOFTWARE

FIELD OF THE INVENTION

The technical field of the present invention is in the area of electronic data processing. More particularly, the invention relates to methods, computer program products and systems for debugging a program code, such as the code of a computer software program.

BACKGROUND INFORMATION

When developing a computer software program, debugging of the program code is often difficult and time consuming. Debugging is often performed in the following manner: finding a program part which causes problems, finding relevant lines of the program code, setting breakpoints in places in the program code which are of interest regarding the status of certain variables, and executing the program code with a debugging software ("debugger"). When executing the debugger, a run-time environment of the program developing environment starts executing the program code, stops its execution at the first breakpoint in the order of the execution, and usually displays the content of the variables for analysis. In order to run the debugger, a failure in the program code (bug) does not need to be present. Also, the debugger may be used to only show the content of certain variables.

The aforementioned procedure has certain disadvantages. The performance of the first three steps mentioned above may require a considerable amount of work if the debugging has to be frequently repeated. Program developers and coworkers, who have to maintain the program, need a good understanding of the total program code, although only part of the code might be interesting for the debugging purpose. Another disadvantage is that the breakpoints are automatically deleted when closing the program. Therefore, when starting the debugging software in a new session, the breakpoints have to be set again.

In view of the foregoing, there is a need for debugging methods and/or systems that provide a more efficient solution to one or more of the problems described above.

SUMMARY OF THE INVENTION

In accordance with the invention, as embodied and broadly described herein, methods and systems consistent with the principles described herein provide for debugging computer program code by using a debugging software. In accordance with one embodiment, a method is provided that comprises: providing software means for causing the debugging software to stop at a breakpoint set in the computer program code; and making the stop of the debugging software dependent upon one or more predefinable conditions.

In accordance with another aspect, the invention, as embodied and broadly described herein, methods and systems consistent with the principles described herein provide a computer system for debugging computer program code by using a debugging software, which provides software means for causing the debugging software to stop at a breakpoint set in the computer program code. In one embodiment, a system is provided that comprises: a memory including program instructions; an input means for entering data; a storage means for storing data; and a processor responsive to the program instructions for stopping the debugging software at a breakpoint dependent upon on one or more predefinable conditions.

Embodiments of the invention are further directed to a computer readable medium, a computer program and a carrier signal comprising instructions for debugging program code according to the methods described herein.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed

BRIEF DESCRIPTION OF THE DRAWINGS

The accompanying drawings, which are incorporated in and constitute a part of this specification, illustrate several embodiments of the invention and together with the description, explain the principles of the invention. In the drawings.

DETAILED DESCRIPTION

Figure 1:
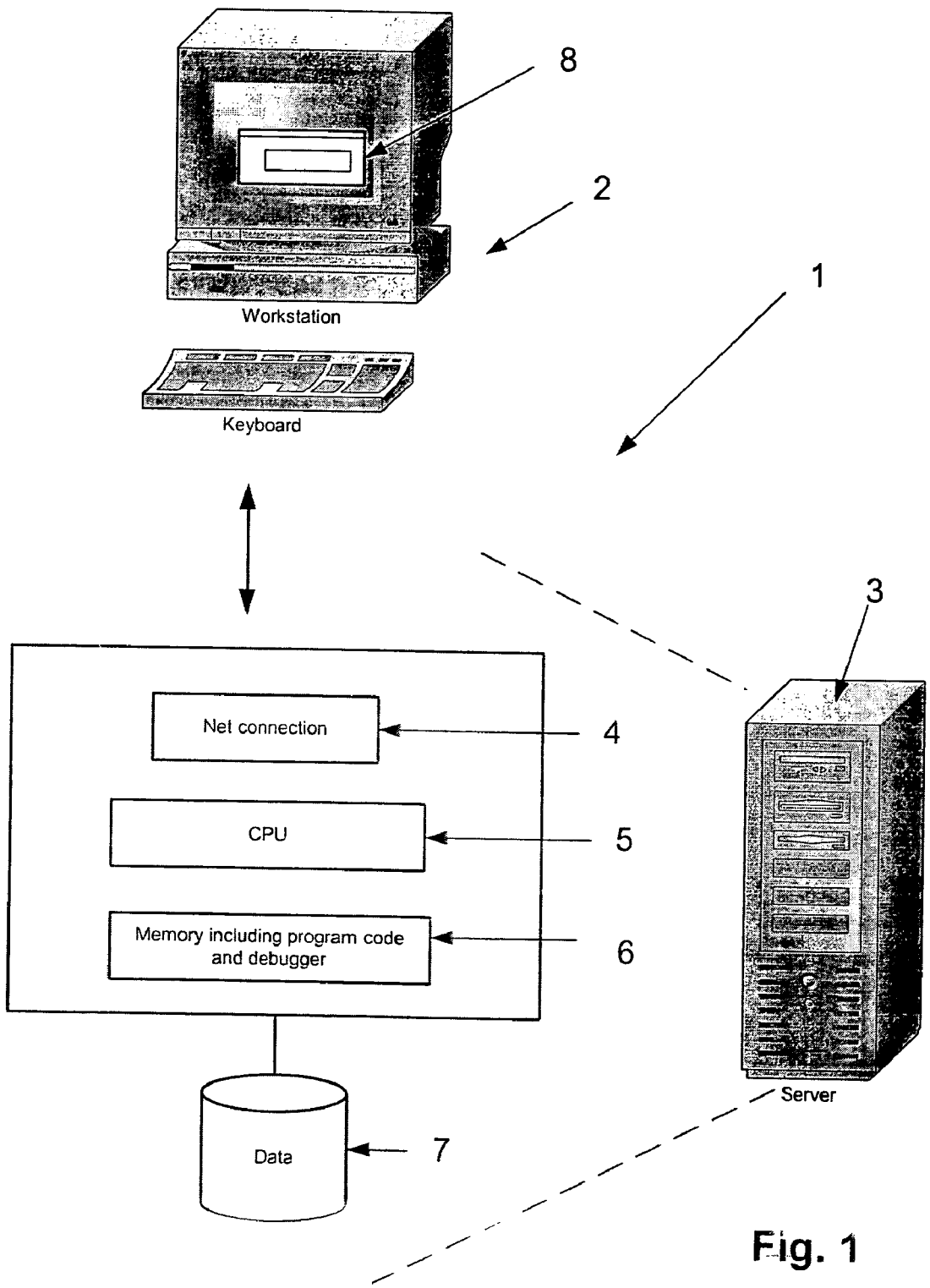
FIG. 1 is an exemplary computer system for implementing embodiments of the present invention.

Reference will now be made in detail to embodiments of the invention, examples of which are illustrated in the accompanying drawings and described herein. Wherever possible, the same reference numbers will be used throughout the drawings to refer to the same or like parts. The exemplary embodiments disclosed herein are intended for purposes of illustration and should not be construed to limit the invention in any manner.

Within the scope of this description, the terms of the invention used in this specification have the meaning that is usual in programming languages like C, C++, JAVA™, ABAP, ABAP Objects. The following explanations are made with reference to the FIGS. 1 to 2. The given examples are of explanatory nature only and are not intended to limit the scope of the invention.

In particular, a breakpoint or a breakpoint instruction, both terms being used herein alternatively, may be any software means or code, which causes a debugging software to stop at a point in a program code, at which the breakpoint or breakpoint instruction is set. Debugging a program code may encompass, within the scope of the invention, executing a program code by means of the debugging software. Whether the program code contains failures (bugs) or not is irrelevant. Further, consistent with embodiments of the invention, a breakpoint may be implemented in a program code by a macro call. The macro may be an abbreviation of the program coding containing the breakpoint instruction. In the macro, the breakpoint may be included in a conditional instruction having one or more conditions. The conditional instruction must be fulfilled if the breakpoint instruction can be executed by a run-time environment. The implementation by a macro is not inevitably necessary. However, it reduces the programming effort considerably.

A condition (abbreviated as "cond") can be any type of logical comparison of data known by those skilled in the art.

Two or more conditions can be combined by logical connections "AND", "OR" and/or "XOR" as may be appropriate in the respective case.

The conditions may be structured such that in all macros of a given program an identical condition must be fulfilled. In this case, the identical condition works like a main switch. Further, in different macros, additional to such a general condition, second, third, fourth or more conditions may be implemented. Structures mixed with "AND", "OR" and/or "XOR" connections are also possible.

The macros can be stored in one or more separate files, which may be included into the program code by include instructions in the definition part of the program. This procedure makes the breakpoints persistent with respect to the closing of the program.

In one embodiment, different macros may be defined using different sets of conditions. The different sets of one or more conditions can be stored in one or more arrays or in one or more tables in volatile and/or non-volatile memory. For example, the array or table can be made accessible for only one type of macro. The set or sets of conditions may be edited during the debugging procedure. This allows, by setting or deactivation of software switches, that all or only certain types of breakpoints, such as those which have one common condition included in the respective macros, be activated or deactivated by a single step. This may be implemented through various approaches. For example, a screen mask may be provided through which a software switch is activated or deactivated by a mouse click or a key stroke. Such a screen mask may be a graphical user interface through which reading and/or writing access is provided to an array that stores one or more conditions.

In another embodiment, a macro is provided in which one of the conditions is whether a string variable handed over by the macro is identical to a respective variable stored in the arrays or tables mentioned above. In this case, a query is started to check whether a preset string is equal to a string given in the macro.

In yet another embodiment, a breakpoint may be, for example, a macro in which the one or more conditions are realized by the classical "if"instruction. This is pointed out in more detail in the following example:

MACRO_1:
IF cond0=TRUE AND cond1=TRUE THEN BREAKPOINT
ENDIF

Additionally, or alternatively, "case" or "select case" or similar instructions may be used.

Figure 2:
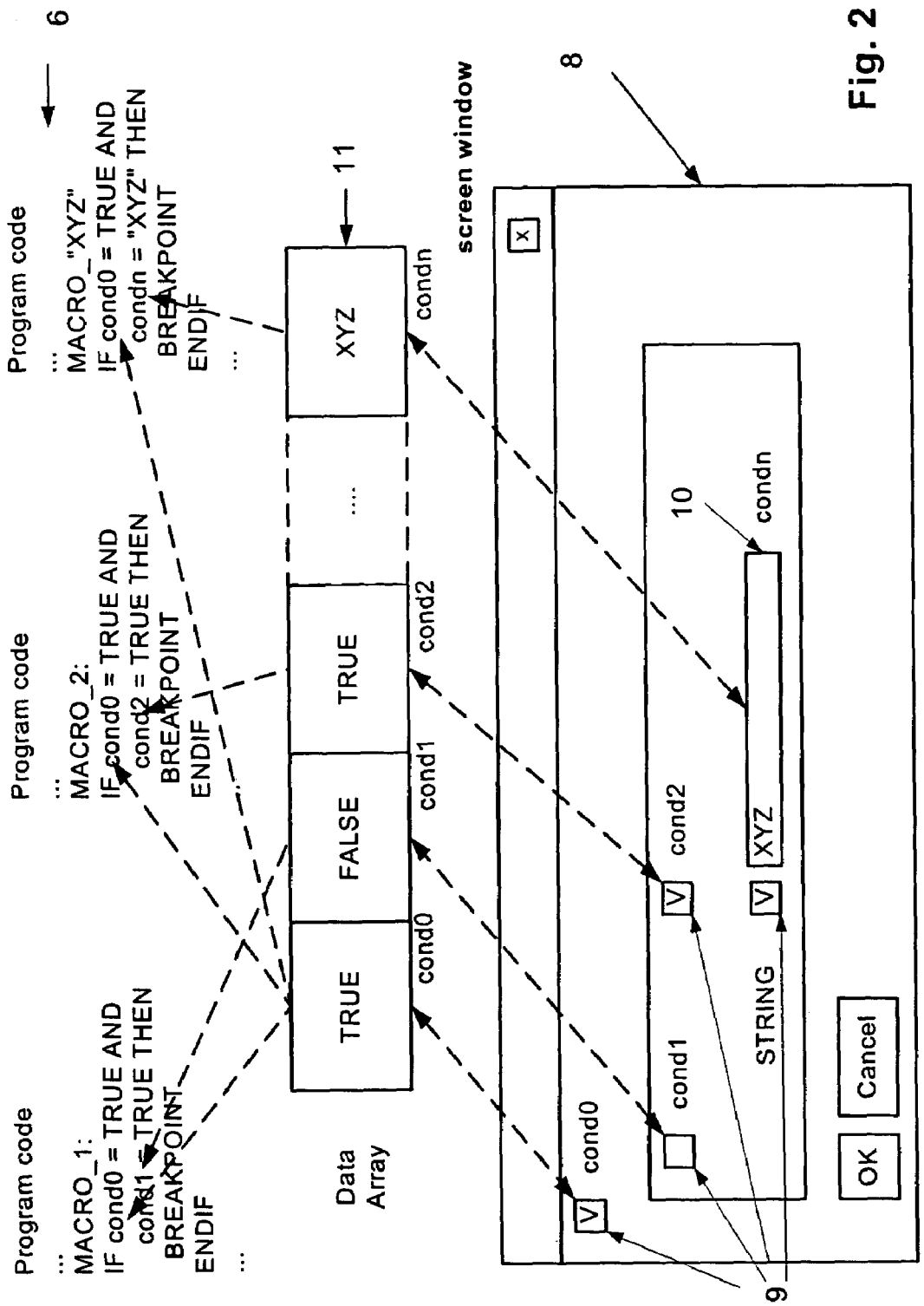
FIG. 2 shows a schematic representation of an exemplary screen mask to activate or deactivate breakpoints, consistent with embodiments of the invention.

Exemplary embodiments of the invention, by using a breakpoint of the latter type and a screen mask, is shown by the schematic drawings in FIGS. 1 and 2.

FIG. 1 shows a computer system environment 1 for allowing a user to debug program code by means of a debugger, according to the principles as described herein. Computer system 1 comprises a server 3 with a central processing unit 5, a net connection 4 for connection with at least one input/output means 2 (e.g., a screen and/or a keyboard), at least one data storage means 7 and memory 6 including program code and debugging software. On the screen, a screen mask such as window 8 for providing read and write access to the storage means 7 is shown.

In FIG. 2, a schematic representation is provided of an exemplary screen mask to activate or deactivate breakpoints, consistent with embodiments of the invention. Program code stored in memory 6 may include various macros. In the example of FIG. 2, three types of macros are illustrated, each of which includes an "if" instruction and a breakpoint instruction (breakpoint). The three types of breakpoints are named MACRO_, MACRO_2 and MACRO_"XYZ". In each breakpoint, a different set of conditions has to be fulfilled in order to cause the debugger to stop at the respective breakpoint. For example, MACRO_includes cond0 and cond1, MACRO_2 includes cond0 and cond2, and MACRO_"XYZ" includes cond0 and condn. Whether a condition is fulfilled or not can be decided by the contents of the respective fields of a data array 11, where respective fields may be allocated to respective conditions. For example, in FIG. 2, fields "cond"i" with i from 1 to n are allocated to the conditions of the same name.

In the exemplary embodiment of FIG. 2, cond0 reads as: if the content of field cond0 in the data array is TRUE (i.e., contains the boolean value TRUE), then cond0 is fulfilled. Further, condn reads as: if the content of field condn of the data array is equal to "XYZ" (i.e., contains the string "XYZ"), then condn is fulfilled.

In the example of FIG. 2, the fields of data array 11 can be accessed by read and write operations by a user via a graphical user interface such as window 8, which provides means for editing data. A user may set a field in the data array to TRUE or FALSE (boolean variable) by clicking with a mouse on boxes 9 named, for example, according to the conditions they refer to. A "V" or other appropriate character(s) or symbol(s) may be used to indicate that the content of the respective field in the data array 11 has the content TRUE. Further, a blank or different character(s) may indicate to the user that the content of the respective field in the data array 11 has the content FALSE. The string for condn may be edited via a keyboard in a screen field 10. As will be appreciated by those skilled in the art, screen window 8 may have additional attributes, such as an "OK" button to save entries in storage and a "Cancel" button to escape without saving. Other attributes may also be provided, such as a "Close" button.

As can be deduced from FIG. 2, cond0 is a general condition, which allows a user to completely deactivate all macros (MACRO_1, MACRO_2 and MACRO_"XYZ") in the program by one click. Further, in the example of FIG. 2, only the breakpoint instructions in MACRO_2 and MACRO_"XYZ" will be executed (i.e., cond1 is FALSE, whereas cond2 is TRUE and condn is "XYZ" in the data array 11), which means that the debugger will stop at the respective places where the macros are incorporated in the program code.

Instead of the boolean variables used in this example, any other set of variables can be used, such as 0 and 1, A and B or mixtures thereof.

The invention is of general nature and may use debugging software in any programming language or environment, which supports a statement to define a breakpoint, such as FORTRAN, PASCAL, C, C++, ABAP, ABAP Objects or Visual Basic™. A technical advantage of the breakpoints according to the inventive concept is that such breakpoints, when set in the program code, are persistent even if the debugging session is closed.

Computer programs based on the written description of this invention are within the skill of an experienced developer.

The invention and its embodiments may be implemented in digital electronic circuitry, or in computer hardware, firmware, software, or in any combinations thereof. The invention may be implemented as a computer program product (i.e., a computer program) tangibly embodied in an information carrier (e.g., in a machine-readable storage device or in a propagated signal), for execution by or to control the operation of a data processing apparatus (e.g., a programmable processor, a computer, or multiple computers). A computer program may be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention and its embodiments may be performed by one or more programmable processors executing a computer program to perform functions of the invention by operating on input data and generating output.

Processors suitable for the execution of a computer program may include, by way of example, both general and special purpose microprocessors, and any one or more processors of any kind of digital computer. Generally, a processor may receive instructions and data from a read-only memory or a random access memory or both. The essential elements of a computer include a processor for executing instructions and one or more memory devices for storing instructions and data. Generally, a computer may also include, or be operatively coupled to receive data from or transfer data to, or both, one or more mass storage devices for storing data (e.g., magnetic, magneto-optical disks, or optical disks). Information carriers suitable for embodying computer program instructions and data may include all forms of non-volatile memory, including by way of example: semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by or incorporated in ASICs (application-specific integrated circuits).

To provide for interaction with a user, the invention may be implemented on a computer having a display device such as a CRT (cathode ray tube) or LCD (liquid crystal display) monitor for displaying information to the user and a keyboard and a pointing device such as a mouse or a trackball by which the user may provide input to the computer. Other kinds of devices may be used to provide for interaction with a user as well; for example, feedback provided to the user may be any form of sensory feedback, such as visual feedback, auditory feedback, or haptic feedback; and input from the user may be received in any form, including acoustic, speech, or haptic input.

Other embodiments of the invention, including modifications and adaptions of the disclosed embodiments, will be apparent to those skilled in the art from consideration of the specification and practice of the invention disclosed herein. The foregoing description of implementations of the invention have been presented for purposes of illustration and description. These descriptions are not exhaustive and do not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. Therefore, it is intended that the specification and examples be considered as exemplary only, with a true scope and spirit of the invention being indicated by the following claims.

What is claimed is:

1. A method for debugging a first computer program code by using debugging software, the method comprising:
   including breakpoint computer program code within the first computer program code, the breakpoint computer program code referring to one or more conditional breakpoints;
   providing a software for causing the debugging software to stop at the one or more breakpoints referred to in the breakpoint computer program code; and
   stopping the debugging software based on one or more predefinable conditions referred to in the breakpoint computer program code, wherein the breakpoint computer program code includes a call to at least one of data and code stored externally to the breakpoint computer program code.

2. The method of claim 1, wherein:
   the one or more predefinable conditions are different for at least two breakpoints.

3. The method of claim 1, wherein:
   storing the one or more predefinable conditions in a data array.

4. The method of claim 3, wherein the data array is editable by using a screen mask.

5. The method of claim 3, wherein:
   the data array is a table.

6. The method of claim 3, wherein:
   the data array is accessible for read and write operations via a graphical user interface.

7. The method of claim 1, wherein:
   the one or more predefinable conditions are identical for a predefined type of breakpoint.

8. The method of claim 1, further comprising:
   storing the one or more predefinable conditions in a data array which is accessible for only one type of breakpoint.

9. The method of claim 1, wherein:
   the one or more predefinable conditions are changeable during debugging.

10. The method of claim 1, further comprising:
    storing the one or more predefinable conditions in a non-volatile memory.

11. The method of claim 1, wherein the breakpoint computer program code includes a macro call.

12. The method of claim 1, wherein the breakpoint computer program code is a macro call included in the first computer program code, the macro call referring to a macro not included in the first computer program code.

13. A computer system for debugging a first computer program code by using debugging software, comprising:
    software for causing the debugging software to stop at one or more breakpoints referred to in a breakpoint computer program code, the breakpoint computer program code included within the first computer program code and referring to one or more conditional breakpoints;
    a memory including program instructions;
    an input means for entering data;
    storage means for storing data; and a processor responsive to the program instructions for stopping the debugging software at a breakpoint based on one or more predefinable conditions referred to in the breakpoint computer program code, wherein the breakpoint computer program code includes a call to at least one of data and code stored externally to the breakpoint computer program code.

14. The computer system of claim 13, wherein:
the one or more predefinable conditions are different for at least two breakpoints.

15. The computer system of claim 13, further comprising:
a data array that stores the one or more predefinable conditions.

16. The computer system of claim 15, further comprising:
a screen mask for editing the data array.

17. The computer system of claim 15, wherein:
the data array is a table.

18. The computer system of claim 15, further comprising:
a graphical user interface for performing read and write operations on the data array.

19. The computer system of claim 13, wherein:
the one or more predefinable conditions are identical for a predefinable type of breakpoint.

20. The computer system of claim 13, further comprising:
a data array that stores the one or more predefinable conditions, and that is accessible for only one type of breakpoint.

21. The computer system of claim 13, wherein:
the one or more predefinable conditions are changeable during the debugging.

22. The computer system of claim 13, further comprising:
a non-volatile memory that stores the one or more predefinable conditions.

23. The computer system of claim 13, wherein:
the breakpoint computer program code includes a macro call.

24. The computer system of claim 13, wherein the breakpoint computer program code is a macro call included in the first computer program code, the macro call referring to a macro not included in the first computer program code.

25. A computer program product embodied on a tangible computer readable medium, the computer program product comprising:
instructions for debugging a first computer program code by using debugging software;
breakpoint computer program code included in the first computer program code, the breakpoint computer program code referring to one or more conditional breakpoints;
instructions for causing the debugging software to stop at the one or more conditional breakpoints referred to in the breakpoint computer program code, wherein the breakpoint computer program code includes a call to at least one of data and code stored externally to the breakpoint computer program code.

26. The computer program product of claim 25, wherein the breakpoint computer program code includes a macro call.

27. The computer program product of claim 25, wherein the breakpoint computer program code is a macro call included in the first computer program code, the macro call referring to a macro not included in the first computer program code.

* * * * *

UNITED STATES PATENT AND TRADEMARK OFFICE
CERTIFICATE OF CORRECTION

PATENT NO.       : 7,225,433 B2
APPLICATION NO.  : 10/612011
DATED            : May 29, 2007
INVENTOR(S)      : Frank Jentsch et al.

It is certified that error appears in the above-identified patent and that said Letters Patent is hereby corrected as shown below:

On The Title Page Item -73-, "ASSIGNEE" should be --SAP AG, Walldorf (DE)--

Signed and Sealed this

Thirty-first Day of July, 2007

JON W. DUDAS
*Director of the United States Patent and Trademark Office*